UNITED STATES PATENT OFFICE.

EMILE BRONNERT, OF NIEDERMORSCHWEILER, GERMANY, ASSIGNOR TO VEREINIGTE GLANZSTOFF FABRIKEN AKTIENGESELLSCHAFT, OF ELBERFELD, GERMANY.

PROCESS FOR THE PRODUCTION OF FORMYLCELLULOSES.

1,061,977. Specification of Letters Patent. Patented May 20, 1913.

No Drawing. Application filed April 13, 1911. Serial No. 620,832.

*To all whom it may concern:*

Be it known that I, EMILE BRONNERT, a subject of the German Emperor, residing in Niedermorschweiler, Germany, have invented certain new and useful Improvements in Processes for the Production of Formylcelluloses, of which the following is a specification.

My invention relates to the production of formylcelluloses.

It relates particularly to the process set forth in my U. S. application, Serial No. 575518, filed August 4, 1910. In that application I have proposed, by the reaction of concentrated formic acid to transform into formylcellulose, the cellulose hydrates remaining in the manufacture of artificial silk as by-products in the form of threads and the like.

In the art of working cellulose small unworked residua of spinning solutions are often left over from the working operation, and it can also happen, that, in consequence of interruption in working, defective production, and so forth, sometimes whole charges of finished spinning solution cannot be spun, yet these must be used to be saved from waste. From such waste solutions, the cellulose can be obtained as cellulose hydrate by precipitation and washing, and without shaping the same, and this can be treated as the waste cellulose hydrate in the form of threads or the like is treated, by simply dissolving it in concentrated formic acid and preferably under a gentle heat, whereby are obtained valuable formylcellulose products. Should it happen therefore, that there was a lack of artificial silk refuse, suitable cellulose hydrates for the production of formylcellulose may be obtained from such waste solutions. A solution of cellulose in cuprammonia, for example, may be utilized by precipitating the cellulose with alkali or acid, (and without forming into threads) cleansing, freeing from copper, washing and drying. To form formates, the cellulose hydrate thus obtained is simply placed in formic acid and very gently heated. A formylcellulose solution is directly obtained. The formic acid employed is preferably the ordinary technical formic acid of 96% concentration.

The cellulose-hydrates will dissolve in the formic acid at ordinary temperatures, but that which is preferred is up to 40° or 50° centigrade. At higher temperatures the solution is formed more rapidly but is more thinly flowing, presumably in consequence of further hydrolysis of the cellulose-hydrates and formation of more hydrated formylcellulose. The proper temperature at which to use the acid is, however, best determined in the manner set forth by Cross and Bevan in their book "*Outlines of Cellulose*," for testing other cellulose derivatives, that is, by taking portions of the solutions produced at different temperatures, evaporating the solvent, and testing the resultant product as to luster and elasticity.

It it not believed to be best to dissolve the cellulose-hydrates too rapidly or to have the solutions of too high percentage, the best results, according to present knowledge, being obtained with a solution of only 6%, produced at a moderate temperature, for example 25° centigrade. The formylcellulose is then obtained from the solution by removal of the surplus formic acid, this being preferably accomplished by distilling the acid at a low temperature in a rarefied atmosphere, until the desired consistency is reached. By this method the formic acid serving only as solvent may be recovered.

The cellulose hydrate which is obtained according to the present invention by precipitating cellulose *en masse* from its solution (and corresponding to waste artificial silk products) cannot be obtained, according to experiments that have been made, by soaking cellulose in cuprammonia (for example in the proportion of 1 molecule of cellulose to ½ molecule of copper), or by mercerizing cotton with caustic soda, washing and drying.

The unfashioned hydrate thus produced forms esters somewhat more slowly than the regular thread refuse, and produces more viscid solutions, without doubt because the cellulose molecule is hydrated still higher, or in another manner, than the, perhaps, more uniformly dried threads. Yet these solutions of unfashioned cellulose are very serviceable, and they can form a valuable substitute for refuse artificial silk threads and other fashioned waste products for the formation of formylcellulose. The present invention, therefore, relates to the treating of unmolded cellulose, apparently of a certain degree of hydration, in place of the waste products described in the said application, a degree of hydration which is adapted to the formation of formic acid esters. These hydrates have on examination been found to possess a low degree of hydration and to be weakly hydrolyzed. That is, by "hydrating" is meant the change effected by reception of water ($H_2O$) by the cellulose in compounds similar to mercerized cotton; and by "hydrolyzing" is meant the decomposition of the cellulose, effected with the reception of the constituents of water ($H+O$) producing a strongly reducing hydro-cellulose.

I claim:

1. The process of producing formylcelluloses, which comprises subjecting to the action of concentrated formic acid weakly hydrolyzed cellulose hydrates precipitated en masse from their solutions.

2. The process of producing formylcelluloses, which comprises subjecting to the action of concentrated acid weakly hydrolyzed and weakly hydrated cellulose hydrates precipitated en masse from their solutions.

3. The process of producing formylcelluloses, which comprises precipitating weakly hydrolyzed cellulose hydrates from their solutions, and then subjecting the said hydrates to the action of concentrated formic acid.

4. The process of producing formylcelluloses, which comprises precipitating en masse weakly hydrolyzed cellulose hydrates from their solutions, and then subjecting the said hydrates to the action of concentrated formic acid.

5. The process of producing cellulose formates, which comprises precipitating a cuprammonia cellulose solution, washing and drying the so-formed cellulose hydrate, and subjecting the same to the action of concentrated formic acid.

6. The process of producing cellulose formates, which comprises precipitating en masse a cuprammonia cellulose solution, washing and drying the so-formed cellulose hydrate, and subjecting the same to the action of concentrated formic acid.

7. The process of producing formylcelluloses, which comprises dissolving cellulose in ammonium copper oxid, precipitating the cellulose en masse, removing the copper constituents, washing and drying, and then subjecting the cellulose hydrate thus obtained to the action of concentrated formic acid.

In witness whereof, I have hereunto signed my name in the presence of two subscribing witnesses.

EMILE BRONNERT. [L. S.]

Witnesses:
  CHAS. J. WRIGHT,
  ALFRED HINKEL.